United States Patent
Chang et al.

(10) Patent No.: US 8,070,042 B1
(45) Date of Patent: Dec. 6, 2011

(54) PROCESS FOR JOINING STAINLESS STEEL PART AND SILICON CARBIDE CERAMIC PART AND COMPOSITE ARTICLES MADE BY SAME

(75) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Wen-Feng Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/170,897

(22) Filed: Jun. 28, 2011

(30) Foreign Application Priority Data

Nov. 22, 2010 (CN) .......................... 2010 1 0553801

(51) Int. Cl.
*B23K 31/02* (2006.01)
*B23K 28/00* (2006.01)
*B23K 11/00* (2006.01)

(52) U.S. Cl. ...................... 228/122.1; 228/194; 228/246; 219/78.01; 219/78.02; 219/76.13; 219/76.16

(58) Field of Classification Search .................... None
See application file for complete search history.

(56) References Cited

U.S. PATENT DOCUMENTS

| | | | | |
|---|---|---|---|---|
| 3,923,609 A * | 12/1975 | Welch et al. | ................... | 156/151 |
| 4,871,107 A * | 10/1989 | Yamada et al. | ............... | 228/121 |
| 5,161,728 A * | 11/1992 | Li | ............... | 228/124.1 |
| 5,251,803 A * | 10/1993 | Kashiba et al. | ............. | 228/124.5 |
| 6,173,886 B1 * | 1/2001 | McCay et al. | ................. | 228/194 |
| 6,280,584 B1 * | 8/2001 | Kumar et al. | ............. | 204/298.15 |
| 6,384,365 B1 * | 5/2002 | Seth et al. | ................... | 219/76.13 |
| 6,870,124 B2 * | 3/2005 | Kumar et al. | ............. | 219/121.46 |
| 7,189,940 B2 * | 3/2007 | Kumar et al. | ............. | 219/121.43 |
| 7,309,843 B2 * | 12/2007 | Kumar et al. | ............. | 219/121.59 |
| 2002/0011468 A1 * | 1/2002 | Miyasaka et al. | ........... | 219/78.02 |
| 2004/0149813 A1 * | 8/2004 | Weihs et al. | ................... | 228/246 |
| 2005/0051607 A1 * | 3/2005 | Wang et al. | ...................... | 228/246 |
| 2011/0123825 A1 * | 5/2011 | Sakurai et al. | ................ | 428/650 |

FOREIGN PATENT DOCUMENTS

JP            58-135180 A    *   8/1983

* cited by examiner

*Primary Examiner* — Kiley Stoner
(74) *Attorney, Agent, or Firm* — Altis Law Group, Inc.

(57) ABSTRACT

A process for joining a stainless steel part and a silicon carbide ceramic part, comprising steps of: providing a stainless steel part, a SiC ceramic part, and a Al foil; bringing surfaces of the stainless steel part, SiC ceramic part, and Al foil into contact, with the titanium foil inserted between the metal part and ceramic part; applying a pulsed electric current to the stainless steel part, SiC ceramic part, and Al foil, heating the stainless steel part, SiC ceramic part, and Al foil to a joining temperature of about 500-650° C., and simultaneously applying a joining pressure of about 50-100 MPa to the stainless steel part, SiC ceramic part, and Al foil while the current is applied, and maintaining the joining temperature and the joining pressure for about 10-30 minutes.

9 Claims, 2 Drawing Sheets

PROCESS FOR JOINING STAINLESS STEEL PART AND SILICON CARBIDE CERAMIC PART AND COMPOSITE ARTICLES MADE BY SAME

CROSS-REFERENCE TO RELATED APPLICATIONS

The present application is related to co-pending U.S. patent application Ser. No. 13/170,876, entitled "PROCESS FOR JOINING CARBON STEEL PART AND SILICON CARBIDE CERAMIC PART AND COMPOSITE ARTICLES MADE BY SAME", by Chang et al. These applications have the same assignee as the present application and have been concurrently filed herewith. The above-identified applications are incorporated herein by reference.

BACKGROUND

1. Technical Field

The exemplary disclosure generally relates to a process for joining a metal part and a ceramic part, especially to a process for joining a stainless steel part and a silicon carbide ceramic part, and an article made by the process.

2. Description of Related Art

It is desirable to join stainless steel parts and silicon carbide ceramic parts. However, due to distinct physical and chemical properties, it can be difficult to join stainless steel and silicon carbide ceramic by implementing typical bonding methods such as braze welding, fusion welding, and solid diffusion bonding.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining stainless steel part and silicon carbide ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
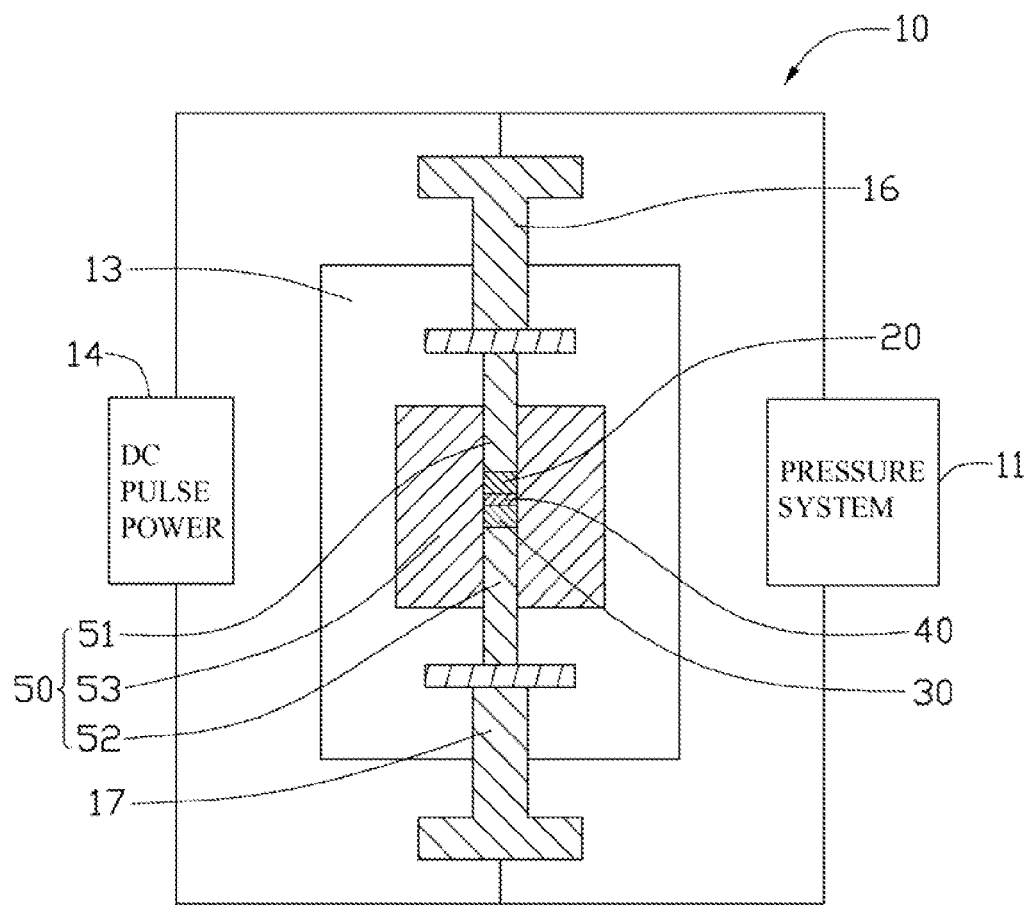
FIG. 1 is a schematic cross-sectional view of an example of a spark plasma sintering device for implementing the present process.

The process according to the present disclosure is generally implemented by a spark plasma sintering (SPS) device as illustrated in FIG. 1.

Figure 2:
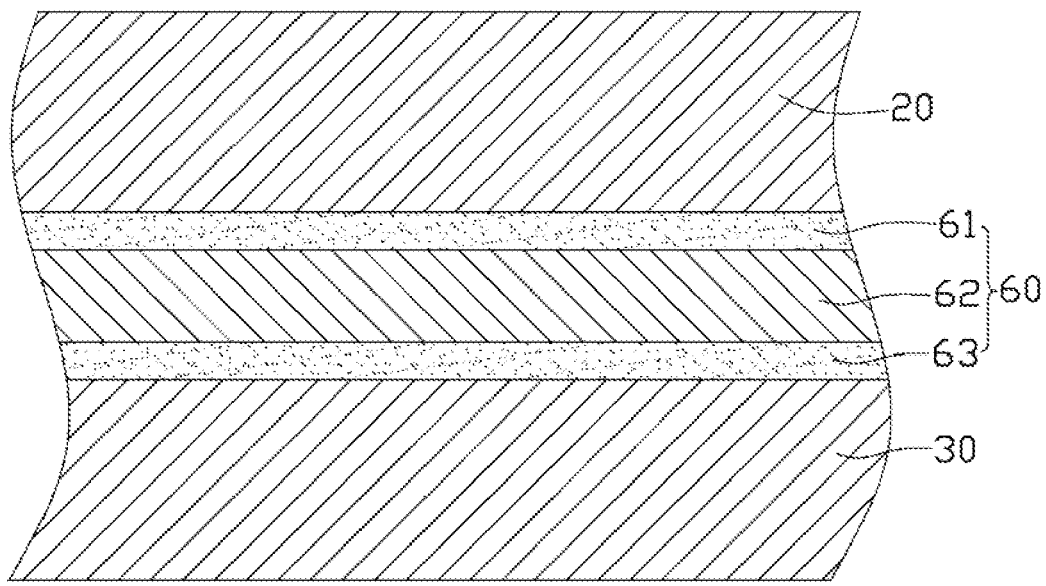
FIG. 2 is a cross-sectional view of an exemplary embodiment of the present article made by the present process.

Referring to FIGS. 1 and 2, an exemplary process for joining a stainless steel part and a silicon carbide ceramic part may include the following steps.

A stainless steel part 20, a silicon carbide (SiC) ceramic part 30, and aluminum (Al) foil 40 are provided. The Al foil 40 is used as a joining medium between the stainless steel part 20 and the SiC part 30. The Al foil 40 has a thickness of about 0.1-0.5 mm.

The stainless steel part 20, SiC ceramic part 30, and Al foil 40 are pretreated. The pretreatment may include the step of polishing the surfaces of the stainless steel part 20, SiC ceramic part 30, and Al foil 40, for example using sandpaper, thus producing smooth surfaces. Then, the stainless steel part 20, SiC ceramic part 30, and Al foil 40 are ultrasonically cleaned with an organic solution (e.g., alcohol or acetone) in an ultrasonic cleaner, to remove grease from their surfaces. Then, the stainless steel part 20, SiC ceramic part 30, and Al foil 40 are rinsed with water and dried.

A clamping mold 50 made of electro-conductive material, such as graphite, is used to hold the stainless steel part 20, SiC ceramic part 30, and Al foil 40. The clamping mold 50 includes an upper pressing member 51, a lower pressing member 52, and a receiving part 53. The receiving part 53 defines a cavity 55 for receiving the stainless steel part 20, SiC ceramic part 30, and Al foil 40. The upper pressing member 51 and the lower pressing member 52 extend towards the cavity 55 from two opposing directions and can be moved relative to the cavity 55 by a pressure system such as hydraulic pressure system.

The stainless steel part 20, SiC ceramic part 30, and Al foil 40 are placed into the cavity 55 and clamped by the upper pressing member 51 and lower pressing member 52. The Al foil 40 is inserted between the stainless steel part 20 and the SiC ceramic part 30. The upper pressing member 51 and the lower pressing member 52 from two opposite sides, bring the surfaces of the parts to be joined into tight contact, accordingly, compressing the stainless steel part 20, SiC ceramic part 30, and Al foil 40 therebetween.

A SPS device 10 is provided. The SPS device 10 includes a pressure system 11 for providing pressure to the parts to be joined, a sintering chamber 13, and a DC pulse power 14 for providing pulse current to the parts and heating up the parts. In this exemplary embodiment, the SPS device 10 is a "SPS3.20MK-IV" type device sold by SUMITOMO Ltd.

The clamping mold 50 is placed into the sintering chamber 13. The upper pressing member 51 and the lower pressing member 52 are electrically connected to the positive electrode 16 and negative electrode 17 of the DC pulse power 14. The sintering chamber 13 is evacuated to an internal pressure of about 6-10 Pa. A pulsed electric current is applied to the parts to be joined, heating the parts at a rate of about 20 degrees Celsius per minute (° C./min) to about 40° C./min. When the temperature of the parts reaches about 200° C., the parts are heated at a rate of about 80-150° C./min until the temperature reaches the joining temperature of about 500-650° C. When the temperature of the parts reaches about 200° C., the upper pressing member 51 and the lower pressing member 52 driven by the pressure system 11 begin to press toward each other at about 10 MPa to press the parts clamped therebetween. The clamping pressure applied by the members 51,52 steadily increases, until the temperature of the parts reaches about 500-650° C., and the clamping pressure reaches about 50-100 MPa. The pressure and temperature are maintained in their respective peak ranges for about 10-30 min, so the Al foil 40, stainless steel part 20, and the SiC ceramic part 30 react and diffuse with each other to form a joining part 60 (shown in FIG. 2) between the stainless steel part 20 and the SiC ceramic part 30. Thereby, the stainless steel part 20 and the SiC ceramic part 30 are connected via the Al foil 40, forming a composite article 100. The composite article 100 is removed after the sintering chamber 13 is cooled.

Referring to FIG. 2, in the process of making the composite article 100, a pulsed electric current is applied to the stainless steel part 20, SiC ceramic part 30, and the Al foil 40. Because there are spaces between the adjacent parts, sparks are created between the spaces. Thereby high temperature plasma is produced. The spark plasma cleans and activates the surfaces of the parts to improve the diffusion ability of the parts. Furthermore, under the heating of the pulsed electric current, the Al foil 40 having relative high reaction activity becomes soft and releases Al atoms. The Al atoms diffuse onto the stainless steel part 20 and the SiC ceramic part 30 to physically and chemically react with the stainless steel part 20 and the SiC ceramic part 30, thereby a new phase between the stainless steel part 20 and the SiC ceramic part 30 may be formed. The new phase can reduce the internal stress of the SiC ceramic/stainless steel interface, facilitating the diffusion between the stainless steel part 20 and the SiC ceramic part 30. Thus, the stainless steel part 20 can substantially connect to the SUS part 30 via the Al foil 40 by spark plasma sintering.

The present process produces a final and permanent joint of maximum strength. The process requires a short hold time and a low vacuum level inside the sintering chamber 13, thus producing significant time and energy savings.

The composite article 100 manufactured by the present process includes the stainless steel part 20, the SiC ceramic part 30, and the now-formed joining part 60 connecting the stainless steel part 20 to the SiC ceramic part 30. The joining part 60 is formed by placing the Al foil 40 between the stainless steel part 20 and the SiC ceramic part 30, and then heating by applying a pulsed electric current and pressing the stainless steel part 20 and the SiC ceramic part 30 as described. The joining part 60 results from interaction between the Al foil 40, stainless steel part 20, and the SiC ceramic part 30. In particular, the joining part 60 includes:

a) a first transition layer 61: The first transition layer 61 is adjacent to the stainless steel part 20. The first transition layer 61 results from interaction of the stainless steel part 20 and the Al foil 40. The first transition layer 61 mainly includes Al—Fe solid solutions, and intermetallic compounds comprising Al and Fe (such as $FeAl_3$);

b) an aluminum layer 62: The aluminum layer 62 is adjacent to the first transition layer 61. The aluminum layer 62 results from portions of the Al foil 40 that do not react with either the SiC ceramic part 30 or the stainless steel part 20; and c) a second transition layer 63: The second transition layer 63 is located between the aluminum layer 62 and the SiC ceramic part 30. The second transition layer 63 results from interaction of the SiC ceramic part 30 and the Al foil 40. The second transition layer 63 is mainly composed of compounds comprising Al and C, and compounds comprising Al and Si.

The joining part 60 of the composite article 100 has no cracks or holes, and has a smooth surface. The stainless steel/SiC ceramic interface of the composite article 100 has a shear strength of about 30-60 MPa.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A process for joining a stainless steel part and a silicon carbide ceramic part, comprising steps of:
   providing a stainless steel part, a SiC ceramic part, and a Al foil;
   bringing surfaces of the stainless steel part, SiC ceramic part, and Al foil into contact, with the aluminum foil inserted between the stainless steel part and SiC ceramic part;
   applying a pulsed electric current to the stainless steel part, SiC ceramic part, and Al foil, heating the stainless steel part, SiC ceramic part, and Al foil to a joining temperature of about 500-650° C., and simultaneously applying a joining pressure of about 50-100 MPa to the stainless steel part, SiC ceramic part, and Al foil while the current is applied, and maintaining the joining temperature and the joining pressure for about 10-30 minutes.

2. The process as claimed in claim 1, wherein the stainless steel part, SiC ceramic part, and Al foil are heated at a rate of about 20-40° C./min before the temperature reaching about 200° C., then are heated at a rate of about 80-150° C./min until the temperature reaches the joining temperature.

3. The process as claimed in claim 2, wherein when the temperature reaches about 200° C., the stainless steel part, SiC ceramic part, and the Al foil begin to be pressed at a pressure of about 10 MPa, then the pressure steadily increases, until the temperature reaches the joining temperature, and the pressure reaches the joining pressure.

4. The process as claimed in claim 1, wherein the step of bringing surfaces into contact further comprises placing the stainless steel part, SiC ceramic part, and Al foil in an electro-conductive clamping mold; the clamping mold including an upper pressing member and a lower pressing member; the upper pressing member and the lower pressing member from two opposite sides for compressing the stainless steel part, SiC ceramic part, and Al foil therebetween.

5. The process as claimed in claim 4, wherein the joining pressure being applied to the stainless steel part, SiC ceramic part, and Al foil through the upper pressing member and the lower pressing member.

6. The process as claimed in claim 4, wherein the step of applying the joining pressure further comprises placing the clamping mold in a sintering chamber of a spark plasma sintering device, and evacuating the sintering chamber to an internal pressure of about 6 Pa to about 10 Pa before applying the joining pressure.

7. The process as claimed in claim 6, wherein the spark plasma sintering device has a DC pulse power, the upper pressing member and the lower pressing member being respectively electrically connected with a positive electrode and a negative electrode of the DC pulse power.

8. The process as claimed in claim 1, wherein the Al foil has a thickness of about 0.1-0.5 mm.

9. The process as claimed in claim 1, further comprising polishing and ultrasonically cleaning the stainless steel part, SiC ceramic part, and Al foil, before the step of bringing into contact.

* * * * *